United States Patent [19]
Olsen

[11] 3,823,346
[45] July 9, 1974

[54] COMPRESSED-GAS-INSULATED ELECTRIC SWITCHING SYSTEM

[75] Inventor: Willi Olsen, Berlin, Germany

[73] Assignee: Seimens Aktiengesellschaft, Munich, Germany

[22] Filed: Jan. 9, 1973

[21] Appl. No.: 322,209

[30] Foreign Application Priority Data
Jan. 20, 1972 Germany............... 2203102

[52] U.S. Cl.................... 317/103, 317/60
[51] Int. Cl................................. H02b
[58] Field of Search...... 317/103, 26, 60; 174/72 R, 174/71 B; 200/148 R; 307/19, 24

[56] References Cited
UNITED STATES PATENTS
3,302,069  1/1967  Wilcox................... 317/103

Primary Examiner—J. D. Miller
Assistant Examiner—Patrick Salce
Attorney, Agent, or Firm—Kenyon & Kenyon Reilly Carr & Chapin

[57] ABSTRACT

An electric high-voltage switching system of the metal-clad compressed-gas-insulated type has two bus bars individually connected through bus bar disconnect switches with a power circuit breaker from which a branch line is supplied with current. An additional disconnect switch connects at least one of the bus bar disconnect switches on its side connected with the bus bar, with the branch line. Closing of this additional disconnect switch permits the branch line to remain powered when the bus bar disconnect switch is opened and/or the power circuit breaker is opened.

5 Claims, 7 Drawing Figures

COMPRESSED-GAS-INSULATED ELECTRIC SWITCHING SYSTEM

BACKGROUND OF THE INVENTION

This invention relates to electric high-voltage switching systems of the metal-clad compressed-gas-insulated type, such as must handle voltages in the area of 110 kilovolts and higher. Such a system is made up of metal enclosures of various shapes enclosing the current-carrying conductors, switches, circuit breaker elements and the like, and which are spaced from the insides of the enclosures by electrically insulating spacing elements. The enclosures are filled with a compressed gas insulation, such as pressurized sulfurhexafluoride. For example, a system of this type is described in "Schweizerische Technische Zeitschrift," vol. 67, No. 24/25, June 1971, in which in FIG. 1 on page 547 such a system is illustrated.

This particular system comprises two bus bars continuously supplied with high-voltage electric current, two bus bar disconnect switches, one for each bus bar, serving to connect either bus bar to a power circuit breaker and through it and a third disconnect switch with a branch line. To service the power circuit breaker or other possible associated equipment, the bus line disconnect switches at least must be opened, rendering the branch line useless. The same result follows if the circuit breaker opens for any reason.

Keeping in mind the expensive construction and bulk of switching systems of the type here involved, it is undesirable to provide a by-pass bar which would shunt the current around the switches or other equipment responsible for the open circuit condition between the bus bars and the branch line.

A switching system of this type may also involve the use of a fourth disconnect switch between the power circuit breaker and the two bus bar disconnect switches, in which case either or both of the latter may remain closed while this fourth disconnect switch is opened to permit servicing of the power circuit breaker or other possible equipment between it and the branch line; but here again the branch line is put out of service upon opening of this fourth disconnect switch. In this case also it is possible to provide a by-pass bus bar but this would again involve undesirable expense and increase in the physical bulk of the system.

SUMMARY OF THE INVENTION

An object of the present invention is to remedy the above situation by permitting the branch line to remain in service by being connected to one of the existing bus bars in the event the existing equipment through which the branch line is ordinarily supplied with current from the one or both of these bus bars is in an open circuit condition, without resorting to the undesirable expense and physical bulk that would be required by the use of a by-pass bus bar.

With the above in mind, the present invention is based on the realization that at least one of the bus bar disconnect switches is physically located relatively close to the branch line. To put it another way, the branch line is relatively close to one of the bus bar disconnect switches, and the latter is connected directly to one of the bus bars.

Based on the above, it has been found possible to place a disconnect switch in the branch line and connect it to the adjacent one of the bus bar disconnect switches so that simply by the use of this one additional disconnect switch the branch line may be shunted around the inactive or open circuit equipment and may continue in operation. In case the fourth disconnect switch is included, which connects the power circuit breaker and other equipment to the bus bars through the two bus bar disconnect switches, the additional disconnect switch may still be installed to connect with the adjacent one of the two bus bar disconnect switches.

DESCRIPTION OF THE PREFERRED EMBODIMENT

Figure 1:
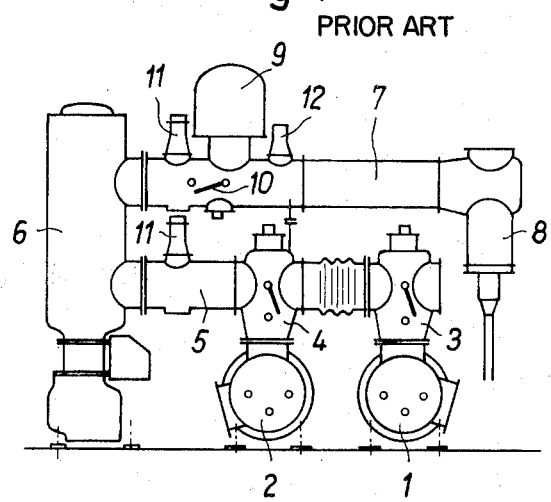
FIG. 1 is an elevation view showing a typical existing switching system of the type to which the present invention applies.
Figure 2:
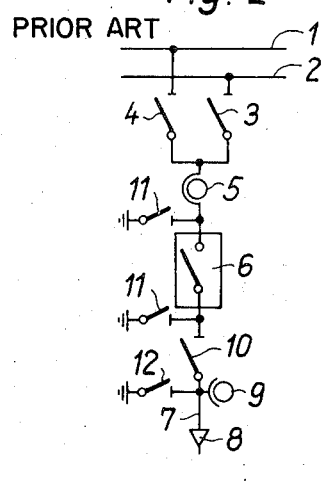
FIG. 2 schematically shows the circuitry of the system of FIG. 1.

Referring to FIGS. 1 and 2, the two high-voltage bus bars 1 and 2 are shown as being connected through bus bar disconnect switches 3 and 4 and from them through a current transformer 5 connecting with the power circuit breaker 6 which is connected through a line 7 with the branch line 8. The circuit breaker supplies the line 7 through a voltage transformer 9 and a disconnect switch 10. Grounding switches 11 are provided in the interest of safety when working on the equipment even if it is protected by opening of the appropriate disconnect switches. It can be seen that opening of the two switches 3 and 4 and/or opening of the circuit breaker 6, and/or opening of the disconnect switch 10 deactivates the branch line 8.

Figure 3:
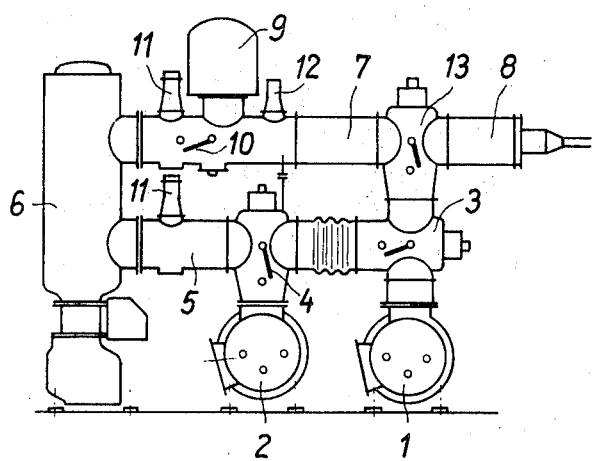
FIG. 3, in elevation, shows the system when embodying the present invention.
Figure 4:
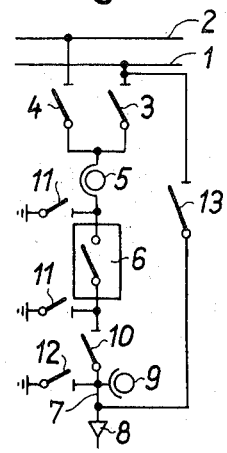
FIG. 4 schematically shows the circuitry of FIG. 3.

Now, according to the present invention, as shown particularly well in elevation by FIG. 3, an additional disconnect switch 13 is installed between the already existing lines 7 and 8, the latter being the branch line. As shown by FIG. 3, the lines 7 and 8 are located physically close to the already existing bus-bar disconnect switch 3, so by inserting the disconnect switch 13 between the lines 7 and 8 over top of the disconnect switch 3 and internally connecting the switch with these lines and with the side of the switch 3 connected to the bus bar 1, the object of the present invention is attained. The bus bar disconnect switch 3 need only be turned 90° to permit this connection. The circuitry is shown by FIG. 4 where it is to be noted that as just described, the disconnect switch 13 is connected to the side of the disconnect switch 3 which connects directly with the bus bar 1. It follows that even through both of the bus bar disconnect switches 3 and 4 are open, the circuit breaker 6 is open, the disconnect switch 10 is open and the grounding switches 11 are closed, the branch line 8 can remain in connection with the bus bar 1. No by-pass bus bar is required.

In the above and hereafter, it is to be understood that similar numerals are used in the case of the schematic drawings and to indicate the corresponding physical parts in the elevation views.

Figure 5:
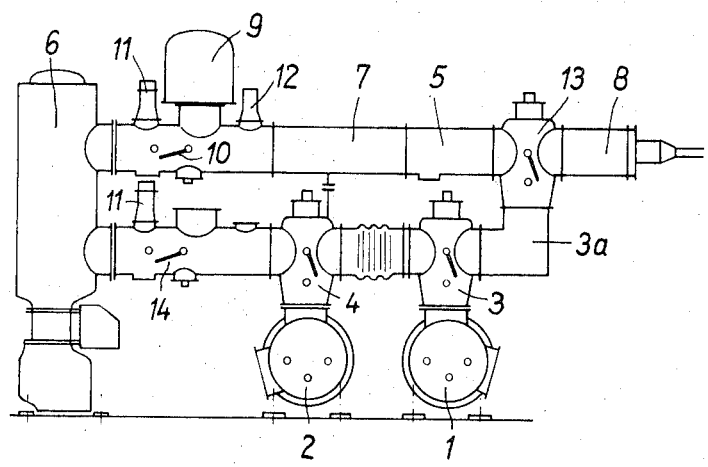
FIG. 5 in elevation shows a second example of a system to which the present invention applies.
Figure 6:
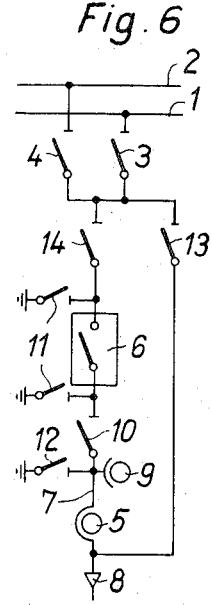
FIG. 6 schematically shows the circuitry of FIG. 5.

In FIGS. 5 and 6 is shown an example wherein the bus bar disconnect switches 3 and 4 connect with the equipment 5, 9 and 6 via a fourth disconnect switch 14; opening of this switch 14 deactivates the chain of equipment including, of course, the branch line 8. However, it also follows that opening of this fourth disconnect switch 14 permits the bus bar disconnect switches 3 and 4 to be closed even though the circuit breaker 6 or the other equipment must be serviced and, therefore, must be deactivated and grounded. Because of this arrangement, the additional disconnect switch 13, is connected to the disconnect switch 3 as indicated physically by FIG. 5 with the circuitry shown by FIG. 6. Here again the disconnect switch 13 provides a by-pass around the inactive equipment to the branch line 8. In this case it is not even necessary to turn the bus-bar disconnect switch from its pre-existing orientation and the additional switch 13 may be internally electrically connected to either side of this switch 3.

Figure 7:
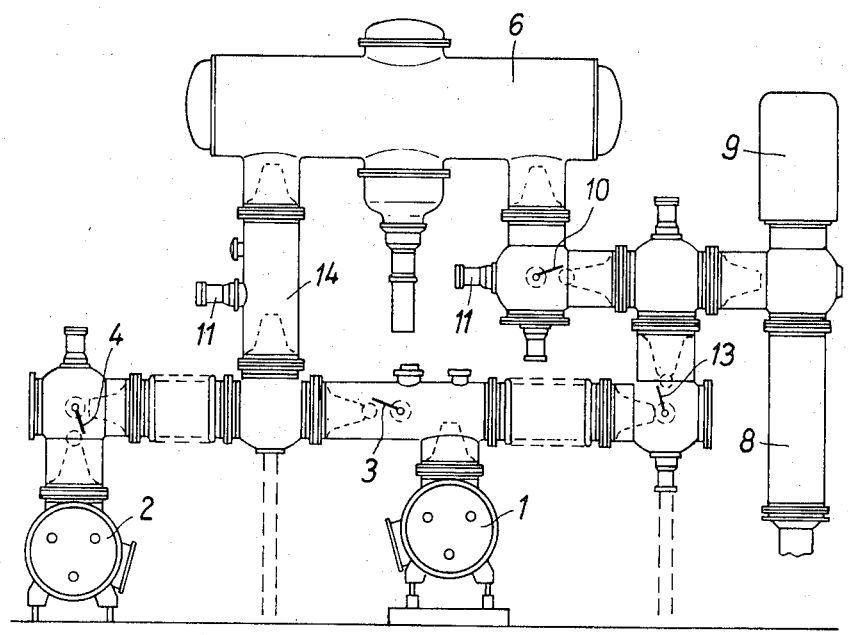
FIG. 7 in elevation shows a further example of a system of the general type described and to which the present invention is applied.

Finally in FIG. 7 an arrangement is shown wherein the circuit breaker 6 shows vertically oriented in the preceding figures is horizontally oriented. In this case the additional or branch line switch 13 again may be positioned relatively close to the bus bar disconnect switch 3 which connects with the bus bar 1. It is to be noted that the possibly somewhat long line leading from the bus bar 1 and the disconnect switch 3 and to which the disconnect switch 13 is connected, is normally present and does not represent a by-pass bus bar.

Throughout the foregoing it can be seen that the concept is applicable to any metal-clad compressed-gas-insulated electrical switching system having at least one bus bar, although there may be two, a branch line, and a circuit breaker and at least one disconnect switch through which the branch line is connected to the bus bar, the bus bar disconnect switch being located between the circuit breaker and the bus bar. Opening of either the circuit breaker of this disconnect switch normally would prevent use of the branch line. When the latter and the bus bar disconnect switch are positioned reasonably adjacent to each other, or at convenient locations with respect to each other, the need for a separate by-pass bus bar, with its attendant bulk and expense, is eliminated simply by including in the system only one additional disconnect switch which is electrically connected to the side of the bus bar disconnect switch which is connected to the bus bar. Closing of this additional disconnect switch by-passes the circuit breaker and all other switching equipment that may be included, including the bus bar disconnect switch, so as to permit use of the branch line.

It is to be understood that the additional disconnect switch is physically or mechanically connected to the already existing components and internally electrically connected as described hereinabove. In FIG. 3 the connection is direct, only 90° rotation of the existing switch 3 being required. in FIG. 5 only a short elbow 3a is needed to make the installation with the switch 3 remaining in its original position.

What is claimed is:

1. A metal-clad, gas-insulated electrical switching system having at least one bus bar, a branch line, a circuit breaker, a first disconnect switch for connecting one end of the circuit breaker to the bus bar, and a second disconnect switch for connecting the other end of the circuit breaker to the branch line whereby opening of the circuit breaker or either of the disconnect switches normally prevents use of the branch line, the switching system being configured so as to cause the branch line and the first disconnect switch to be positioned adjacent to each other; wherein the improvement comprises an additional disconnect switch, one side of said additional disconnect switch being connected directly to the first disconnect switch and the other side of said additional disconnect switch being connected directly to the branch line.

2. The switching system of claim 1, said one side of said additional disconnect switch being connected directly to the side of the first disconnect switch connected to the bus bar whereby closing said additional disconnect switch causes the same to bypass the circuit breaker and the first and second disconnect switches to permit use of the branch line.

3. The switching system of claim 1 including a second bus bar and a supplementary disconnect switch for connecting the second bus bar to the one end of the circuit breaker.

4. The switching system of claim 3 wherein the respective ends of the first disconnect switch and the supplementary disconnect switch disposed away from the bus bars conjointly defining a common node, the switching system comprising a further disconnect switch connected between said node and the one end of the circuit breaker.

5. The switching system of claim 4, said additional disconnect switch being connected to said first disconnect switch at said common node.

* * * * *